United States Patent [19]
Weber

[11] 3,959,913
[45] June 1, 1976

[54] RELEASABLE NON-SLIP ATTACHMENT MEANS FOR CONNECTING FISHING LINES TO DOWN-RIGGER CABLES

[76] Inventor: Claude J. Weber, 17332 Coles Park, Spring Lake, Mich. 49456

[22] Filed: Aug. 7, 1975

[21] Appl. No.: 602,568

[52] U.S. Cl............................. 43/43.12; 24/137 A; 24/239; 24/263 SB
[51] Int. Cl.².......................................... A01K 91/00
[58] Field of Search................ 43/43.12; 24/137 A, 24/239, 263 SB

[56] References Cited
UNITED STATES PATENTS

| | | | |
|---|---|---|---|
| 582,564 | 5/1897 | Weierbach | 24/239 |
| 2,157,288 | 5/1939 | Gauss | 24/239 |
| 2,316,290 | 4/1943 | Schenbeck | 24/263 SB X |
| 2,482,625 | 9/1949 | Kunkel | 24/137 A |
| 3,131,449 | 5/1964 | Iida | 24/137 A |

FOREIGN PATENTS OR APPLICATIONS

| | | | |
|---|---|---|---|
| 539,611 | 9/1941 | United Kingdom | 24/137 A |

Primary Examiner—Louis G. Mancene
Assistant Examiner—Daniel J. Leach
Attorney, Agent, or Firm—Price, Heneveld, Huizenga, & Cooper

[57] ABSTRACT

In one specific form, the apparatus is embodied as a tubular housing which fits in the hand of the user, with a trigger-like release arm protruding from a slot in the side of the housing to be pulled rearwardly by a finger of the user. The release arm retracts a spring-loaded plunger within the tubular housing so that the plunger head clears a slot extending midway into the housing from one side, such that a weighted downrigger cable or line may be readily slipped into the slot and the arm released to allow the plunger head to seat against that portion of the downrigger line within the slot in the tubular housing, thereby capturing and entrapping the downrigger line securely within the slot by a two-point engagement which securely holds the device in place without permitting it to slide along the line.

26 Claims, 8 Drawing Figures

RELEASABLE NON-SLIP ATTACHMENT MEANS FOR CONNECTING FISHING LINES TO DOWN-RIGGER CABLES

BACKGROUND

This invention relates to fishing apparatus, particularly of the type used in sport fishing where, in order to troll at depth levels of fifty to perhaps two hundred feet or more, a heavy weight at the end of a small winch cable (usually called a "downrigger") is used to sink a lure-carrying trolling line to the desired depth, and to maintain it at such depth. Typically, the fishing line is releasably attached to the weighted downrigger line so that when a strike occurs the fishing line releases from the downrigger cable, leaving only the fish and lure attached to the fishing line, and freeing the latter from the heavy downrigger weight (which remains attached to the downrigger cable), for greater sporting action.

Typically, such trolling equipment is used by having a permanently-mounted fitting in the downrigger line, usually at its bottom, near the weight, to which the fishing line is clipped or otherwise fastened, and thereby attached to the downrigger cable. For example, U.S. Pat. No. 3,778,918 shows a device with a ring at each end for direct attachment to the downrigger line at one end and the downrigger weight at the other end, with a medial portion of the device adapted to receive a pair of spaced, springloaded legs which form the release clip which is pulled away by the force of a strike to free the fishing line from the weight.

In such an arrangement, only a single fishing line can be used with each downrigger, and this has numerous disadvantages. In the first place, it is desirable to use a number of different fishing lines, each on its own fishing rod and reel, at varying depths, in order to cover a larger depth range while trolling, to thereby increase the chance of encountering fish; however, the downrigger units are expensive and if purchased in numbers equalling the desirable number of fishing lines the expense would be more than most fisherman would find agreeable. Further, there is not sufficient space on many, or even most, fishing boats to accommodate such a large number of downrigger units, even if expense were no objection; in fact, even a fairly small number of downrigger units becomes a problem as a result of the clutter of equipment so produced.

It has been proposed to attach multiple fishing lines to a single downrigger cable, but no really effective means for doing this has heretofore been provided. For one thing, the position of attachment should not be permanently fixed along the length of the downrigger line, but should instead be variable in order to permit adjustment and variations in the spacing between different fishing lines; however, it is very important that the attachment not slip along the downrigger cable despite the fact the attachment is totally submerged and used at considerable depths under water, and must withstand the forces resulting from being towed through the water while pulling a long length of trolled line carrying a dodging or otherwise moving lure at the end, which also exerts either an upward or downward pulling effect, depending upon buoyancy characteristics. Furthermore, the attachment absolutely must not kink or otherwise damage the downrigger line, which is typically a stranded metal cable, since otherwise the resulting stress concentration at such a point would result in breakage of the downrigger cable and loss of equipment.

BRIEF SUMMARY OF INVENTION AND ADVANTAGES

The present invention provides a positive-acting and very reliable device by which a series of different individual fishing lines may be securely but releasably attached to a single downrigger cable, at spaced points along its length, in a manner which is so secure that the attachment will not slip under any known or expectable condition encountered in actual fishing operation, and yet without in any way harming or even marking the downrigger cable. Furthermore, the device is extremely easy and quick to operate, and is essentially foolproof; at the same time, it is relatively simple in structure, with only a few parts which are easy to manufacture, or are available from existing commercial sources, and yet it is extremely durable and longlasting under actual operating conditions.

Broadly stated, the apparatus comprises an elongated body which defines guide surfaces and establishes an axis of travel for a movable plunger, such body further defining a pair of spaced indexing surfaces, or seats, for receiving the downrigger line to dispose the same transversely relative to the axis of plunger movement, so that the plunger engages the downrigger line at each of the two spaced points or seats to entrap the line against the seats, thereby frictionally latching the device to the downrigger cable. The body also includes means for attachment to a lure-carrying fishing line, to tether such line to the downrigger cable, such attachment means preferably including a releasable portion allowing the lure-carrying line to pull free from the downrigger cable under desired circumstances. The apparatus further includes manually-operable means for retracting the plunger from its downrigger line-entrapping engagement, to thereby enable release of the device from the downrigger line. Also, the invention contemplates a new and desirable release apparatus for engaging the fishing line and releasably connecting it to the downrigger line-attachment means, the new and improved line release apparatus comprising a clip having a pair of jaws pivotally coupled to each other and a spring mechanism loading the jaws together at one end, and further including at least one resilient band encircling both of the jaws near the ends thereof which are loaded together, together with a resilient friction element attached to at least one of the jaws at such end and disposed between them, for frictionally but releasably holding a fishing line between the jaws.

The invention as so summarized and the objectives and advantages thereof may be more fully understood in contemplation of the following more detailed description of certain preferred embodiments.

DESCRIPTION OF PREFERRED EMBODIMENTS

Figure 1:
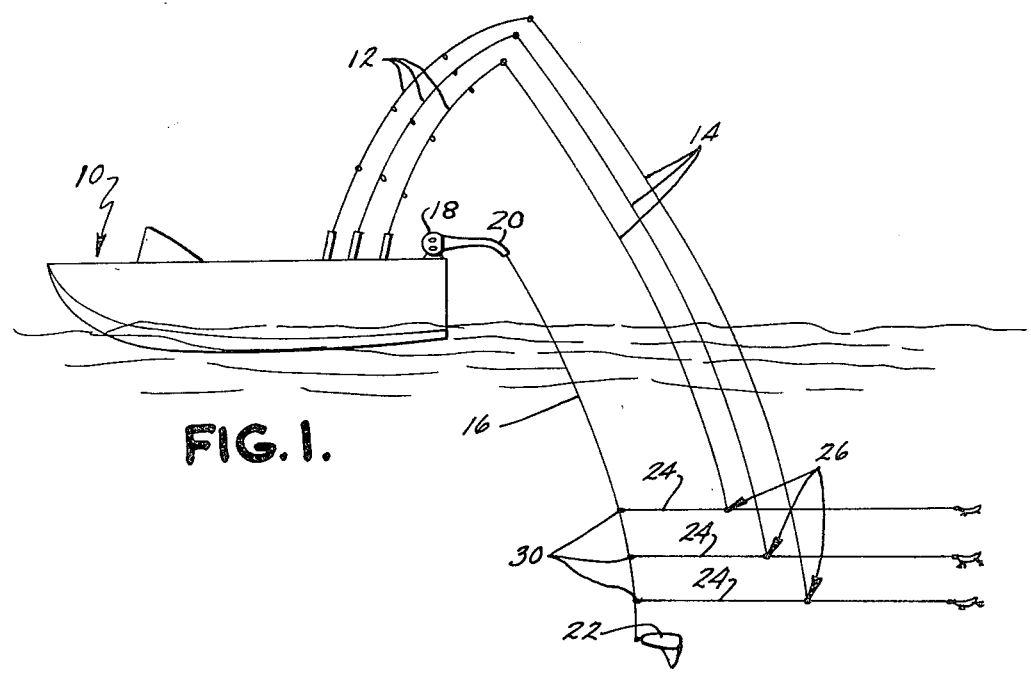
FIG. 1 is a pictorial view illustrating the general environment and use of the novel apparatus.
Figure 2:
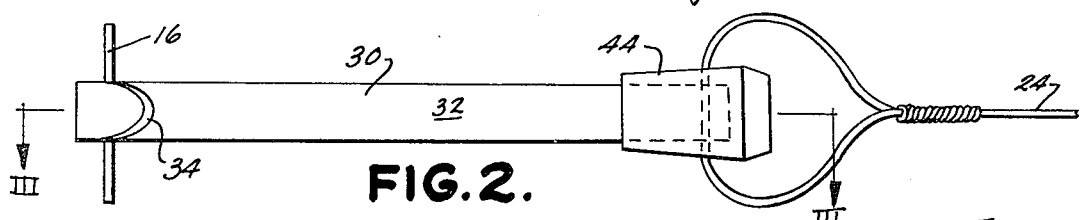
FIG. 2 is an enlarged composite view showing the apparatus attached in place to a downrigger line.
Figure 3:
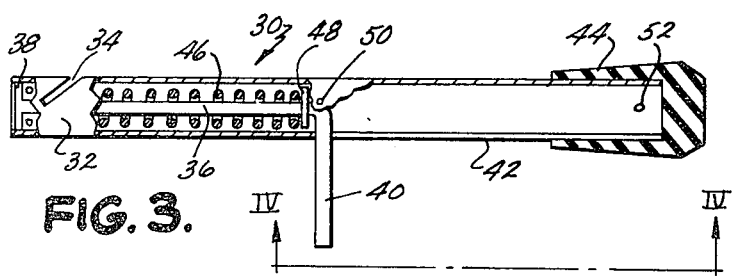
FIG. 3 is a central sectional overhead plan view of the apparatus as seen through the plane III-III of FIG. 2.

To illustrate the environment of the invention and the general manner of use, a fishing vessel 10 is shown carrying a plurality (for example, three) of fishing rods 12, each having its own fishing line 14, but all of which are coupled to a single downrigger cable 16 which extends from a manually operable winch 18 having a boom or support arm 20 with a pulley sheave at its end, over which the downrigger cable 16 is entrained, the downrigger cable having a torpedo-shaped or other such heavy weight 22 at its lower end, by which the desired depth is obtained. As illustrated, each of the fishing lines 14 is coupled to the downrigger cable at a different selected point along its length by a releasable attachment apparatus 30 in accordance with the invention, from which a short tether line 24 extends to a fishing line release 26, a preferred type of which is described subsequently.

The downrigger attachment apparatus 30 in accordance with the invention is illustrated in more detail in FIGS. 2-6 inclusive, and includes a tubular body 32 comprising one form of cylinder means whose walls define a number of important surfaces, or areas. First among these is a slot 34 for receiving the downrigger cable 16, the slot extending laterally into the tubular body through a side thereof, preferably at an acute angle relative to the longitudinal axis of the body, as illustrated, with each end of the slot preferably terminating in alignment, substantially on a common diameter of the body, as illustrated.

Inside the tubular body 32 is a plunger member 36 having an enlarged head 38 whose diameter is complementary to the inside diameter of the tubular body 32. At its end opposite the enlarged head, the plunger 36 has a laterally offset handle or release arm portion 40, which is preferably (but not necessarily) integral or one-piece with the remainder of the plunger. Handle 40 extends laterally through a slot 42 (FIGS. 3 and 4) in the tubular wall of body 32, which slot may extend longitudinally along the tubular body from one end (FIG. 4), which end preferably (but not necessarily) is covered by an end cap 44 frictionally or otherwise seated thereover, such end cap preferably being of plastic or rubber material. By using such a cap, no particular finishing or deburring of the end extremity of the cylinder is necessary, since even the end of the slot 42 will be covered and protected, and will not harm the hand of the user, particularly at such times as when the end of the tube carrying cap 44, herein referred to as the butt end of the apparatus, is seated in the palm of the hand or against the fingers in using the apparatus.

As illustrated, a coil spring 46 lies inside the tubular body 32, behind the enlarged head 38, biasing the latter toward the adjacent end of the body (i.e., to the left as seen in the drawings). At its opposite end, coil spring 46 bears against a restraining washer 48 which is staked in position by a pair of oppositely-disposed, inwardly projecting, punch pricks 50, which are located approximately at the forward end termination of slot 42 (FIG. 4), but at a position rotated approximately 90° therefrom.

In assembly, the tubular body 32 is preferably formed from a desired length of tube stock, a convenient size for a typical application being three-eights inch diameter tubing cut approximately five inches long. The longitudinal slot 42 and the angular slot 34 may be milled or sawed in place, and the plunger 36 with the spring 46 and washer 48 telescoped thereover may be inserted endwise into the body from its butt end, with handle 40 traveling up slot 42. The assembly as so formed may then be placed into an appropriate jig or fixture and the prick punches 50 are made to hold the washer 48 from being moved toward the right as shown in the drawings. The end cap 44 may then slip over the butt end of the tubular body, and an aperture 52 is drilled through both the end cap and the the tubular body, in the position shown. The hole 52 is for the purpose of receiving tether line 24 mentioned previously, by which the device is connected to the fishing line, as by the line-release 26, as mentioned previously.

Figure 5:
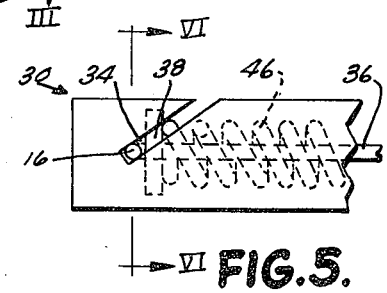
FIG. 5 is an enlarged, fragmentary side elevation showing the downrigger cable entrapped and held in place.
Figure 4:
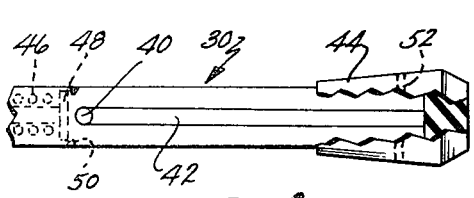
FIG. 4 is a fragmentary side elevational view of the apparatus of FIG. 3, as seen from the plane IV-IV thereof.
Figure 6:
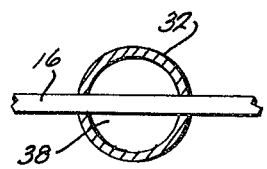
FIG. 6 is a fragmentary sectional view taken through the plane VI-VI of FIG. 5.

In use, the apparatus 30 is readily manipulated by one hand, typically by holding the butt end against the plam of the hand and crooking the index finger around the handle or release arm 40, as though holding a pistol. The device may be releasably attached to the downrigger line 16 at any point above the weight 22, simply by holding the winch 18 momentarily in position, retracting the handle 40 so that the head 38 of the plunger moves rearwardly of the angular slot 34 to fully expose the latter, and thereupon merely hooking the tubular body onto the downrigger line by drawing the body along the line until the slot 34 passes over the line and the latter seats in the end of the slot, whereupon the trigger is merely released, allowing the compression in spring 46 to forcibly engage the head 38 of the plunger against the downrigger cable, as illustrated in FIG. 5.

In so doing, the entire width of the plunger head 38 is brought to bear against that portion of the downrigger cable lying inside the tubular walls of the body 32, entrapping the downrigger cable in the two spaced end extremities of slot 34, with the interior walls of the tubular body acting as guide surfaces for the plunger, and producing a pair of spaced shear-stress engagement points on the line at opposite sides of the plunger head. By such an entrapment of the downrigger line, at points which are spaced apart at least on the order of about twice (or more) the diameter of the downrigger line, and with an elongated body locating the point of attachment of the tether line 24 (or the actual attachment of the fishing line 14) at some appreciable distance from the downrigger line, forces imparted to the attachment apparatus 10 during fishing are never able to slide the attachment along the downrigger line, to bring about undesired changing of the spacing or positioning of the fishing lines along the downrigger line. For this purpose, while the spring 46 must certainly have a spring force on the order of two or three pounds for an apparatus of the dimensions mentioned above, which is entirely suitable for fresh water or salt water sport fishing with conventional trolling gear, it will be appreciated that this is much less force than might otherwise be regarded as necessary to produce non-slipping operation.

Figure 7:
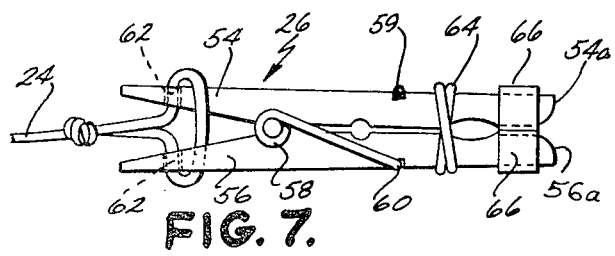
FIG. 7 is a side elevational view of the novel fishing line-release apparatus.
Figure 8:
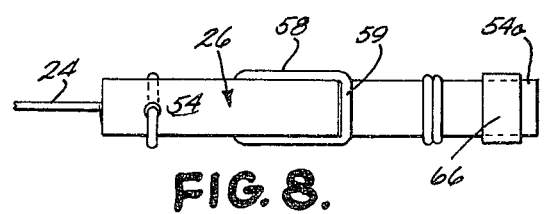
FIG. 8 is a plan view of the apparatus shown in FIG. 7.

A preferred form of fishing line-engaging release means 26 is illustrated in FIGS. 7 and 8, where the same may be seen to comprise a device in the nature of a spring or snap-type clothespin, having a pair of pivotally interconnected jaws 54 and 56 which pivot upon a coil-type torsion spring 58 having offset end extremities 59 and 60 which extend over the top surfaces of jaws 54 and 56, respectively, in grooves formed for this purpose, so as to clench the forward end extremities 54a, 56a, of the jaws together.

While a conventional clothespin may in fact be used as a basis for the line release mechanism 26, it will be observed that the diverging extremities of jaws 54 and 56 must have an aperture 62 formed in each to receive the tether line 24, by which the line release is coupled to the downrigger line, as by the attachment apparatus 30 described above. In this connection, the tether line is preferably attached in a manner tending to pull the diverging jaws toward one another, and thereby facilitate opening of the opposite jaw portions 54a, 56a, and consequent release of the fishing line, upon the occurrence of a strike. Also, additional spring force must be provided to augment that resulting from a conventional torsion spring 58, and this can desirably be obtained by use of a resilient, elastomeric band 64 which is bound around the forward ends of the jaws, tending to pull them together. The extent of the force provided by the augmenting elastic band 64 may be increased either by pulling the same tighter and increasing the number of passes around the jaws, or by varying the position of the bands along the length of the jaws, i.e., moving the bands away from the fulcrum point about spring 58. Additionally, the nature of the engagement surfaces between jaw tip portions 54a and 56a should be improved from that typically found in a conventional clothespin, in the first instance by using a band or other element 66 at least in the area between the jaws, where they meet, which will afford greater purchase and frictional retention on the fishing line which passes therebetween. A desirable instrumentality for this purpose is a reasonably wide band cut from a length of surgical tubing, a soft, rubbery tubing having a high coefficient of surface friction, and having relatively high resiliency. Furthermore, the jaws at the tip portions 54a and 56a are preferably shaped (as by grinding or other machining operation) so as to have flat inward surfaces, as opposed to the conventional ridged or undulating surfaces, such that with the elements 66 in place, the inside surfaces of the two elements 66 meet on a common plane, thereby having a flat area of engagement rather than a mere line of engagement. In this manner, a very suitable and readily useable area is produced for tightly gripping the fishing line; at the same time, however, the line readily snaps loose from between the two jaw tips when the fish strike the lure.

It is entirely conceivable that upon examining the foregoing disclosure, those skilled in the art may devise embodiments of the concept involved which differ somewhat from the embodiments shown and described herein, or may make various changes in structure details to the present embodiment. Consequently, all such changed embodiments or variations in structure which utilize the concepts of the invention and clearly incorporate the spirit thereof are to be considered within the scope of the claims appended herebelow, unless these claims by their language specifically state otherwise.

The embodiments of the invention in which an exclusive property or privilege is claimed are defined as follows.

1. Apparatus for releasably and detachably securing a fishing line to a weighted depth-setting downrigger line, comprising:
   an elongated body defining guide surfaces for a movable plunger and establishing an axis for plunger movement, said body also defining indexing surfaces for seating said downrigger line transversely of said guide surfaces;
   tether line means for attaching a fishing line to said body;
   a movable plunger carried with said body and disposed for movement along said guide surfaces, said plunger having a head portion for engaging said downrigger line and entrapping same upon said indexing surfaces;
   means for urging said plunger into entrapping engagement with said line and for maintaining the plunger in such engagement to thereby attach said body to said downrigger line; and manually-operable means for releasing said plunger from its line-entrapping engagement to thereby enable release of said body from the downrigger line.

2. The apparatus of claim 1, wherein said body comprises an elongated generally cylindrical element having a longitudinal axis and said plunger movement axis generally lies along such longitudinal axis, said indexing surfaces comprising at least a portion of a recess in said cylindrical element disposed generally transversely of the said longitudinal axis thereof.

3. The apparatus of claim 2, wherein said recess comprises a slot extending laterally into said cylindrical element.

4. The apparatus of claim 3, wherein said cylindrical element comprises a tubular structure having a wall-forming structure which at least partially encloses said plunger.

5. The apparatus of claim 4, wherein said slot extends into said tubular wall structure from one side thereof and is oriented to intersect the longitudinal axis of the cylindrical element at an acute angle.

6. The apparatus of claim 1, wherein said indexing surfaces comprise a pair of line-receiving seat areas spaced apart from one another by a distance on the order of at least twice the diameter of said downrigger line, said plunger head portion having sufficient acting area to engage the downrigger line at each of said seat areas.

7. The apparatus of claim 6, wherein said line-receiving seat areas comprise end extremities of a slot extending laterally into said body.

8. The apparatus of claim 7, wherein said body comprises a tubular structure having a wall-forming structure which at least partially encloses said plunger, said slot extending into said wall structure.

9. Apparatus for releasably and detachably securing a fishing line to a weighted depth-setting downrigger line, comprising:
   means defining a pair of seat areas for receiving said downrigger line at a pair of spaced points along its length, said seat areas being spaced apart from one another by a distance on the order of at least twice the diameter of the downrigger line;
   means for engaging said downrigger line at said spaced points along its length and entrapping such line at such points against said seat areas; and
   manually releasable means for holding said line-engaging means against the downrigger line with sufficient force to hold said apparatus immovably in place on the downrigger line against forces acting upon the apparatus during fishing operation as a result of connecting a fishing line to the apparatus and pulling the fishing line and the apparatus through the water by means of the downrigger line.

10. The apparatus of claim 9, wherein said means for engaging said downrigger line at said spaced points comprises a plunger member.

11. The apparatus of claim 9, wherein said means defining said seat areas comprises a cylindrical element having a lateral slot therein, said seat areas comprising end portions of such slot.

12. The apparatus of claim 11, wherein said slot extends into said cylindrical element from one side thereof and is oriented to intersect the longitudinal axis of the cylindrical element at an acute angle.

13. Apparatus for releasably and detachably securing a fishing line to a weighted depth-setting downrigger line, comprising;

means defining a pair of seat areas for receiving said downrigger line at a pair of spaced points along its length;

means for engaging said downrigger line at said spaced points along its length and entrapping the line at such points against said seat areas;

an elongated body extending away from said seat areas generally transversely of said downrigger line;

means for attaching a fishing line to said elongated body at a point along the length of the latter spaced from the downrigger line by a distance at least greater than the distance between said seat areas;

and manually releasable means for holding said line-engaging means against the downrigger line with sufficient force to hold the apparatus in place on the downrigger line against forces acting upon said fishing line during fishing operation.

14. Apparatus for releasably and detachably securing a fishing line to a weighted depth-setting downrigger line comprising:

an elongated body defining guide surfaces for a movable plunger and establishing an axis for plunger movement, said body also defining indexing surfaces for seating said downrigger line transversely of said guide surfaces;

tether line means for attaching a fishing line to said elongated body;

a movable plunger disposed for movement along said guide surfaces and having a head portion for engaging said downrigger line and entrapping same upon said indexing surfaces;

means for urging said plunger into entrapping engagement with said line and for maintaining the plunger in such engagement to thereby attach said body to said downrigger line;

said body defining a butt portion at a point along the length of the body spaced away from said indexing surfaces;

and manually-operable means for releasing said plunger from its line-entrapping engagement to thereby enable release of said elongated body from the downrigger line;

said manually operable means including an arm projection extending laterally from the body at a position between said butt and said indexing surfaces; and resiliently biased means operatively coupled between said arm projection, said plunger and said butt portion of said body, said means arranged to cause withdrawal of said plunger from entrapping engagement with said downrigger line upon relative movement between said butt portion and said arm projection.

15. The apparatus of claim 14, wherein said arm projection is of a shape to be engageable by the human finger and said butt is of a size and shape adapted to be held in the hand, said butt and arm being spaced apart a distance allowing for engagement of the arm projection by at least one of the fingers of the same hand holding the butt portion.

16. The apparatus of claim 15, wherein said arm projection is relatively movable along said body.

17. The apparatus of claim 16, wherein said arm projection is coupled to said plunger and withdraws the same from said downrigger line upon said relative movement of the arm projection toward the butt.

18. The apparatus of claim 17, wherein said plunger and said body are substantially coaxial and mutually telescopable, and said indexing surfaces comprise at least one transverse opening in the body.

19. The apparatus of claim 18, wherein said body is generally tubular and said plunger is disposed within the body, said body having an opening in its tubular wall, and said arm projection extending from said plunger through said wall opening.

20. The apparatus of claim 19, wherein said transverse opening comprises a lateral slot extending into said tubular wall, the end portions of said slot comprising said indexing surfaces.

21. The apparatus of claim 20, wherein said plunger has a head portion at an end opposite said arm projection, said head portion having a width which approximates the inside diameter of said tubular wall to thereby engage most of the downrigger line located between said indexing surfaces.

22. The apparatus of claim 21, wherein said plunger head is spring-loaded toward said downrigger line between the indexing surfaces.

23. The apparatus of claim 1, and including a flexible line attached near one end to said elongated body, a fishing line release clip attached near the other end of said flexible line, said clip comprising a pair of jaws pivotally coupled to each other and having resilient loading means forcing the jaws together at one of their ends and apart at their other end, said loading means including at least one resilient band encircling said jaws near said one end thereof, and said clip also including resilient friction surface means attached to at least one of said jaws at the said one end thereof and disposed between said jaws at such end for frictionally but releasably engaging a fishing line therebetween.

24. A fishing line release clip for frictionally but releasably gripping a fishing line to couple it to a weighted downrigger line or the like, said clip comprising in combination:

A pair of jaws pivotally coupled to each other and having resilient loading means forcing the jaws together at one of their ends and apart at their other end, said loading means including at least one resilient band encircling said jaws near said one end thereof, and said clip also including resilient friction surface means attached to at least one of said jaws at the said one end thereof and disposed between said jaws at such end for frictionally but releasably engaging a fishing line therebetween, said jaws having at least one opening in their said other end for receiving a tether line therethrough for attaching the clip to said downrigger line.

25. The fishing line clip of claim 24 wherein said jaws at said one end and said resilient surface friction means attached to said jaws at said end have mutually cooperating shapes which produce a flat area of contact between said jaws at said one end to afford more than a mere line of contact for engaging said fishing line.

26. The apparatus of claim 24, wherein said resilient friction surface means comprises a band encircling at least one of said jaws at said one end.

* * * * *